US011858150B2

(12) United States Patent
Cauley, Jr. et al.

(10) Patent No.: US 11,858,150 B2
(45) Date of Patent: Jan. 2, 2024

(54) NIPPER

(71) Applicant: AOB Products Company, Columbia, MO (US)

(72) Inventors: Dennis W. Cauley, Jr., Fayette, MO (US); James Tayon, Moberly, MO (US); Anthony Vesich, Columbia, MO (US); Matthew Kinamore, Columbia, MO (US); Curtis Smith, Columbia, MO (US); Josh Neville, Columbia, MO (US); Mark Dalton, Columbia, MO (US)

(73) Assignee: AOB Products Company, Columbia, MO (US)

( * ) Notice: Subject to any disclaimer, the term of this patent is extended or adjusted under 35 U.S.C. 154(b) by 0 days.

(21) Appl. No.: 17/132,763

(22) Filed: Dec. 23, 2020

(65) Prior Publication Data

US 2021/0187764 A1 Jun. 24, 2021

Related U.S. Application Data

(60) Provisional application No. 62/952,851, filed on Dec. 23, 2019.

(51) Int. Cl.
*B26B 13/12* (2006.01)
*B26B 13/28* (2006.01)
*B26B 13/16* (2006.01)

(52) U.S. Cl.
CPC .............. *B26B 13/12* (2013.01); *B26B 13/16* (2013.01); *B26B 13/28* (2013.01)

(58) Field of Classification Search
CPC ......... B26B 13/04; B26B 13/16; B26B 13/28; B26B 13/00; B26B 13/12; B26B 13/14
USPC ......................... 30/231, 232, 254; D8/56, 57
See application file for complete search history.

(56) References Cited

U.S. PATENT DOCUMENTS

| | | | | | |
|---|---|---|---|---|---|
| 73,580 | A | * | 1/1868 | Cook | B26B 13/16 30/261 |
| 123,371 | A | * | 2/1872 | Turner | B26B 13/16 30/261 |
| 630,537 | A | * | 8/1899 | Heimerdinger | B26B 13/04 30/260 |
| 1,007,836 | A | * | 11/1911 | Allison | B26B 13/16 30/261 |
| 1,556,770 | A | * | 10/1925 | Driest, Jr. | B26B 13/04 123/169 CB |
| 1,576,359 | A | * | 3/1926 | Rauha, Jr. | B26B 13/16 30/135 |
| 1,741,109 | A | | 12/1929 | Heimerdinger | |
| 2,142,738 | A | * | 1/1939 | Wakeley | B26B 13/16 30/253 |

(Continued)

*Primary Examiner* — Jason Daniel Prone
(74) *Attorney, Agent, or Firm* — Stinson LLP

(57) ABSTRACT

A nipper, components thereof, and associated methods. The nipper includes first and second jaws, and first and second levers connected to respective ones of the jaws. The jaws are pivotable about a pivot axis to move cutting edges of the jaws toward and away from each other. The jaws and levers have a keyed connection for conjoint pivoting of the respective jaws and levers about the pivot axis. A retainer is configured to retain the cutting edges in a closed arrangement. The nipper includes a poker for cleaning paint from an eyelet of a lure or fishing hook. The poker is movable between stowed and deployed positions with respect to a lever of the nipper.

19 Claims, 8 Drawing Sheets

(56) References Cited

U.S. PATENT DOCUMENTS 2,508,790 A 5/1950 Herr
2,852,846 A 9/1958 Ahlbin
3,404,457 A * 10/1968 Swanstrom, Sr. ...... B26B 13/28 30/267
3,453,651 A 7/1969 Wertepny, Sr.
3,548,496 A * 12/1970 Van Hook ............... B26B 13/04 D8/57
3,688,402 A * 9/1972 Grant ...................... B26B 13/04 30/260
3,861,038 A * 1/1975 Charles ................... B26B 13/12 30/261
4,074,430 A * 2/1978 Sugiyama ............... B26B 13/28 D8/57
4,089,113 A 5/1978 Moritz et al.
4,663,848 A * 5/1987 Sell ......................... B26B 13/12 D8/57
4,791,725 A 12/1988 Amagaya
4,914,820 A * 4/1990 Saito ....................... B26B 13/28 30/254
4,924,572 A * 5/1990 Vogel ...................... B26B 13/12 30/260
5,086,563 A * 2/1992 Sakuma .................. B26B 13/04 30/254
5,279,034 A * 1/1994 Smith ..................... B26B 13/12 30/232
5,699,617 A 12/1997 Mock
5,930,900 A * 8/1999 Chang ..................... B26B 13/16 30/344
5,979,061 A * 11/1999 Demlakian-Apkarian .................. B26B 13/12 D8/57
6,189,219 B1 2/2001 Mock
D469,676 S 2/2003 Miles
6,584,693 B2 * 7/2003 DeBolt ................... B26B 13/12 30/232
6,606,794 B2 8/2003 Rieser
D503,323 S 3/2005 Hasegawa et al.
7,017,462 B2 * 3/2006 Hullam ................... B26B 13/06 30/254
D536,938 S 2/2007 Hasegawa et al.
D536,940 S 2/2007 Peterson et al.
8,109,003 B2 * 2/2012 Liu .......................... A01G 3/02 30/236
8,701,294 B2 4/2014 Bruce et al.
8,713,805 B2 5/2014 Schneider et al.
8,832,945 B2 9/2014 Yang
8,966,690 B2 3/2015 Stokes et al.
9,027,253 B2 5/2015 Huang
9,289,905 B2 3/2016 Cornell et al.
D814,260 S * 4/2018 Dhubb .................... B26B 17/00 D8/52
D817,135 S 5/2018 Huesman et al.
10,451,831 B2 10/2019 Santos et al.
D893,275 S * 8/2020 Weber .............................. D8/57
2002/0112352 A1* 8/2002 Droin ...................... B26B 13/12 30/254
2002/0124415 A1* 9/2002 Mizutani ................. B26B 13/28 30/261
2003/0126747 A1 7/2003 Kusaba
2005/0081386 A1* 4/2005 Chang ..................... B26B 13/14 30/252
2009/0144989 A1* 6/2009 Adachi ................... B26B 13/04 30/254
2010/0269356 A1* 10/2010 Chen ....................... B26B 13/16 30/232
2010/0319202 A1* 12/2010 Lin ......................... B26B 13/04 30/254
2011/0131813 A1* 6/2011 Lin ......................... B26B 13/12 30/232
2015/0250105 A1* 9/2015 Papworth ................ B26B 13/28 30/254
2019/0299431 A1* 10/2019 Montgomery .......... B26B 13/28

* cited by examiner

NIPPER

CROSS-REFERENCE TO RELATED APPLICATION

The present application claims priority to U.S. Provisional Patent App. No. 62/952,851, filed Dec. 23, 2019, which is hereby incorporated by reference in its entirety.

FIELD

The present disclosure generally relates to fishing equipment, and more particularly to a nipper for cutting fishing line.

BACKGROUND

When fishing, people commonly encounter a need to cut fishing line. For example, after a fishing line is tied in a knot to secure the fishing line to a hook or lure, excess fishing line is typically removed by cutting the fishing line adjacent the knot.

SUMMARY

In one aspect, a nipper scissors usable by a person for cutting a fishing line comprises a first jaw including a first cutting edge and a first jaw pivot hub. The first cutting edge extends forward of the first jaw pivot hub. The first jaw pivot hub includes first jaw keying structure. The nipper scissors comprises a first lever including a first lever pivot hub and a first arm. The first arm extends rearward of the first lever pivot hub. The first lever pivot hub includes first lever keying structure. The first lever keying structure is mated with the first jaw keying structure to form a first keyed connection between the first lever pivot hub and the first jaw pivot hub. A second jaw includes a second cutting edge and a second jaw pivot hub. The second cutting edge extends forward of the second jaw pivot hub. The second jaw pivot hub includes second jaw keying structure. A second lever includes a second lever pivot hub and a second arm. The second arm extends rearward of the second lever pivot hub. The second lever pivot hub includes second lever keying structure. The second lever keying structure is mated with the second jaw keying structure to form a second keyed connection between the second lever pivot hub and the second jaw pivot hub. A fastener pivotably connects the first jaw hub to the second jaw hub and defines a pivot axis about which the first and second cutting edges are pivotable upward and downward with respect to each other for moving the cutting edges toward each other to a closed arrangement and away from each other to an open arrangement. The first and second cutting edges extend forward of the pivot axis, and the first and second arms extend rearward of the pivot axis. The first keyed connection connects the first cutting edge and the first arm for conjoint pivoting of the first cutting edge and the first arm about the pivot axis in which downward pivoting of the first arm causes upward pivoting of the first cutting edge. The second keyed connection connects the second cutting edge and the second arm for conjoint pivoting of the second cutting edge with the second arm about the pivot axis in which upward pivoting of the second arm causes downward pivoting of the second cutting edge. The first and second cutting edges are biased away from each other toward the open arrangement. The first arm includes a first finger bed facing upward and the second arm includes a second finger bed facing downward. The first finger bed is sized and shaped for receiving a first fingertip of the person. The second finger bed is sized and shaped for receiving a second fingertip of the person. The first finger bed is arranged with respect to the second finger bed to permit the person to pinch the first and second finger beds toward each other between the first and second fingertips to move the cutting edges from the open arrangement to the closed arrangement.

In another aspect, a nipper scissors usable by a person for cutting a fishing line comprises first and second blades. The first blade includes a first cutting edge. The second blade includes a second cutting edge. The second blade is pivotable toward the first jaw to move the second cutting edge toward the first cutting edge. The nipper scissors includes a first lever connected to the first blade. A second lever is connected to the second blade. The second lever is pivotable toward the second lever to pivot the second blade toward the first blade. A poker is connected to the first lever. The poker has a pointed free end configured to remove paint from an eyelet of a hook. The poker is shielded by first and second guards alongside the poker on opposite sides of the poker. The poker and guards are pivotable with respect to the first lever between a stowed position and a deployed position.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
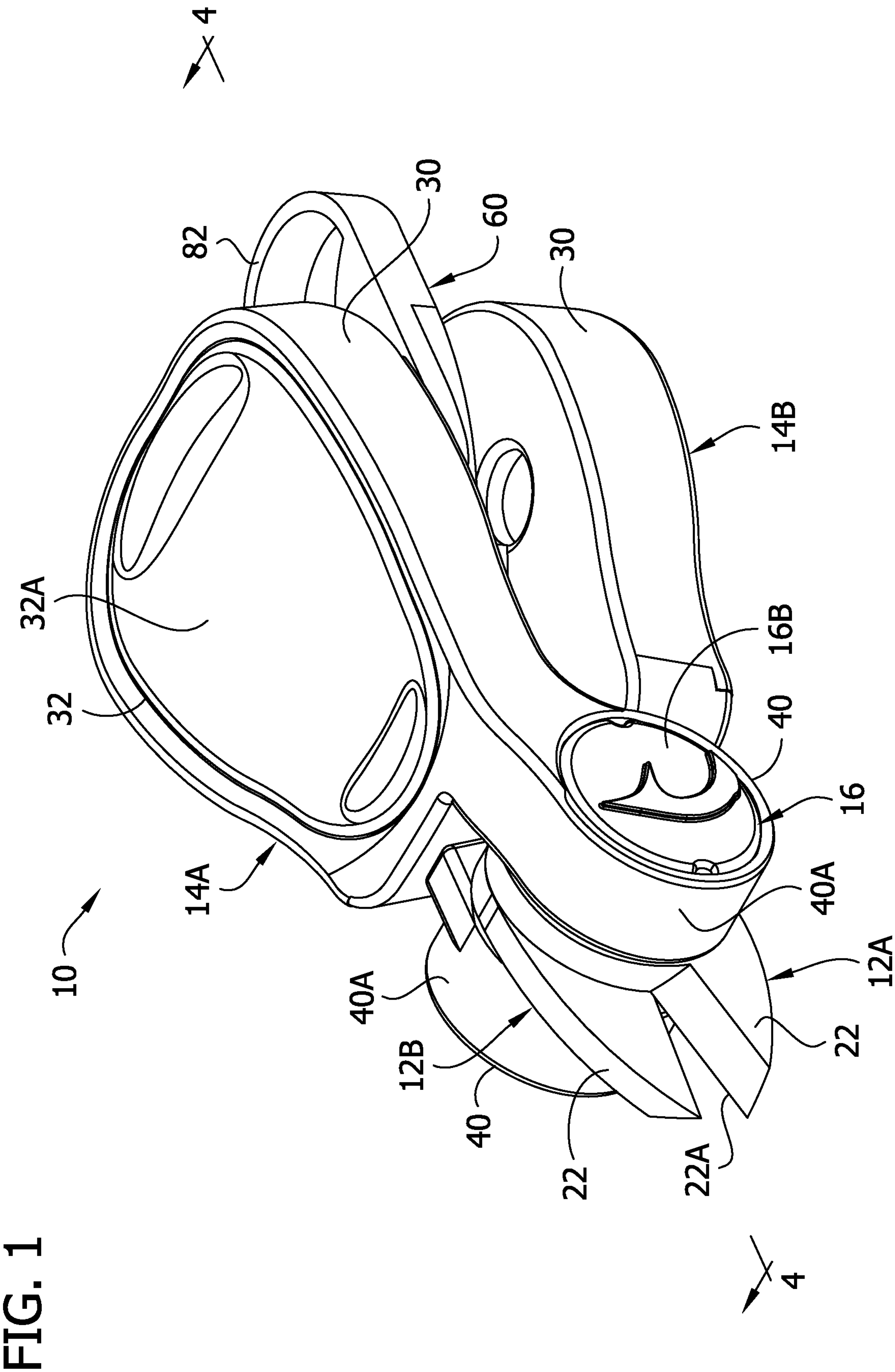
FIG. 1 is a perspective of a nipper of the present disclosure in an open configuration.
Figure 2:
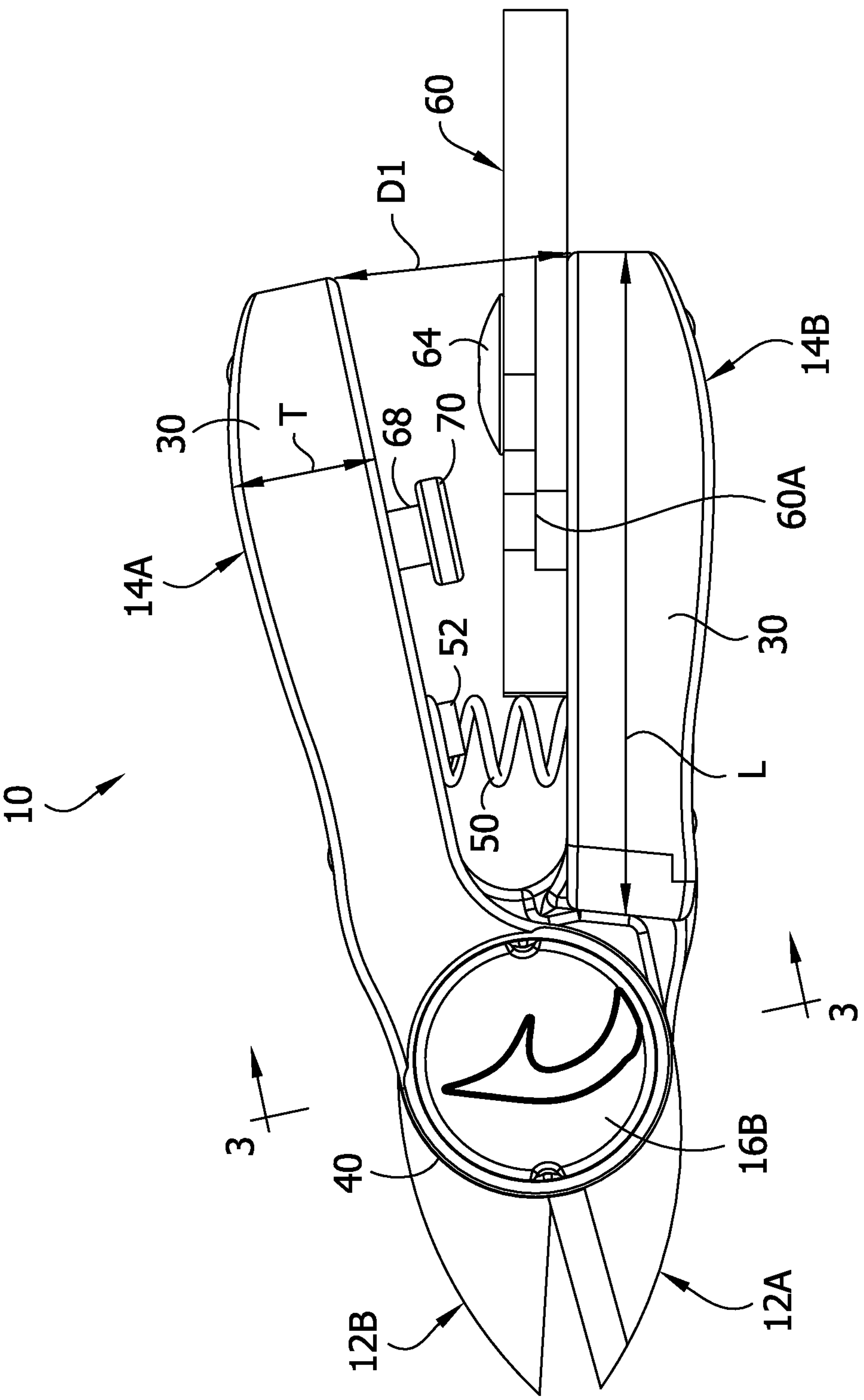
FIG. 2 is a side elevation of the nipper.

Referring to FIG. 1, a nipper of the present disclosure is indicated by 10. In one example, the nipper may be used for cutting fishing line.

The nipper 10 includes a pair of jaws 12A, 12B and a pair of levers 14A, 14B connected to the jaws for moving the jaws to cut an object between the jaws. The jaws 12A, 12B and levers 14A, 14B are pivotable about a pivot connection (defining pivot axis PA) including a fastener 16 connecting the jaws and levers. The jaws 12A, 12B extend forward from the pivot connection, and the levers 14A, 14B extend rearward from the pivot connection.

The jaws 12A, 12B include pivot hubs 20 and blades 22 extending from the pivot hubs. The blades 22 include cutting edges 22A movable upward and downward and arranged for cutting in a scissors motion responsive to upward and downward pivoting of the levers 14A, 14B. The cutting edges 22A extend forward of the respective pivot hubs 20 and forward of the pivot axis PA. The blades 22 are arranged to bypass each other and move between open and closed positions in opposite opening and closing directions generally parallel to a cutting plane CP (FIG. 3) and generally perpendicular to the pivot axis PA. Desirably, the cutting edges 22A are less than 1.5 inches long, and more desirably less than 1 inch long (e.g., about 0.5 inch long). The jaw pivot hubs 20 are on opposite sides of the cutting plane CP and have key openings 20A for connecting the jaws 12A, 12B to the levers 14A, 14B. In the illustrated embodiment, the key openings 20A are generally rectangular and include generally linear edge portions and arcuate edge portions.

The levers 14A, 14B include arms 30 sized and shaped for reception of fingers of a user to actuate the jaws 12A, 12B. The arms 30 include proximal ends connected to lever pivot hubs 40, and include distal ends opposite the proximal ends. The arms 30 are paddle-shaped and have a length L (e.g., desirably less than 2.5 inches, more desirably less than 2 inches) and width W (e.g., desirably less than 2.5 inches, more desirably less than 1.5 inches) greater than the arm thickness T (e.g., desirably less than 1 inch, more desirably less than 0.5 inch). The arms 30 include finger beds 32 having finger press surfaces 32A that face away from each other (upward and downward) and are sized and shaped to receive a finger to permit a user to press the arms toward each other to close the jaws 12A, 12B. In the illustrated embodiment, the finger beds 32 are formed separately from and connected to substructure of the arms 30. For example, the finger beds 32 can be made of a polymeric material that is softer than and has a greater coefficient of friction than the material of the arm substructure (e.g., aluminum or plastic). The finger press surfaces 32A of the finger beds 32 are contoured for reception of fingers. For example, the illustrated press surfaces 32A are concave (broadly, "non-convex"). The press surfaces 32A extend generally perpendicular to the cutting plane CP and the opening and closing directions of the jaws 12A, 12B. The cutting plane CP intersects and generally bisects the press surfaces 32A. A maximum distance D1 between the distal ends of the arms (when the cutting edges are in the closed arrangement) is desirably less than four times the thickness T of an arm, and more desirably less than three times the thickness T (e.g., with D1 measuring less than 2 inches, and more desirably less than 1.5 inches). The finger beds 32 are sized and shaped for receiving opposing fingertips of the person (e.g., thumb and forefinger). The finger beds 32 are sized and configured, and arranged with respect to each other (e.g., spaced from each other in the open arrangement of the cutting edges 22A), to permit the person to hold the nipper 10 between opposing fingertips and to pinch the first and second finger beds toward each other between their opposing fingertips to move the cutting edges 22A from the open arrangement to the closed arrangement. Other configurations can be used without departing from the scope of the present disclosure.

The levers 14A, 14B include pivot hubs 40 connected to the arms 30. The lever pivot hubs 40 are configured for connecting the levers 14A, 14B to the jaws 12A, 12B. The arms 30 extend rearward of the pivot hubs 40. The lever pivot hubs 40 include main bodies 40A and keys 40B extending inward from the main bodies. In the illustrated embodiment, the keys 40B comprise protrusions having a generally cylindrical shape having a cross section closely resembling the key openings 20A of the jaws 12A, 12B. In section, the keys 40B have a generally rectangular shape with generally linear edge portions and arcuate edge portions. The keys 40B are sized and shaped to closely conform to the key openings 20A of the jaws 12A, 12B for keyed engagement of the keys with the key openings. The keys 40B and key openings 20A can be referred to broadly as keying structure. The reception of the keys 40B in the key openings 20A mates the respective levers 14A, 14B and jaws 12A, 12B and causes them to pivot conjointly about the pivot axis PA. The lever pivot hubs 40 are offset to opposite sides of the cutting plane CP. Other configurations (e.g., other types of keying structure) can be used without departing from the scope of the present disclosure.

Figure 3:
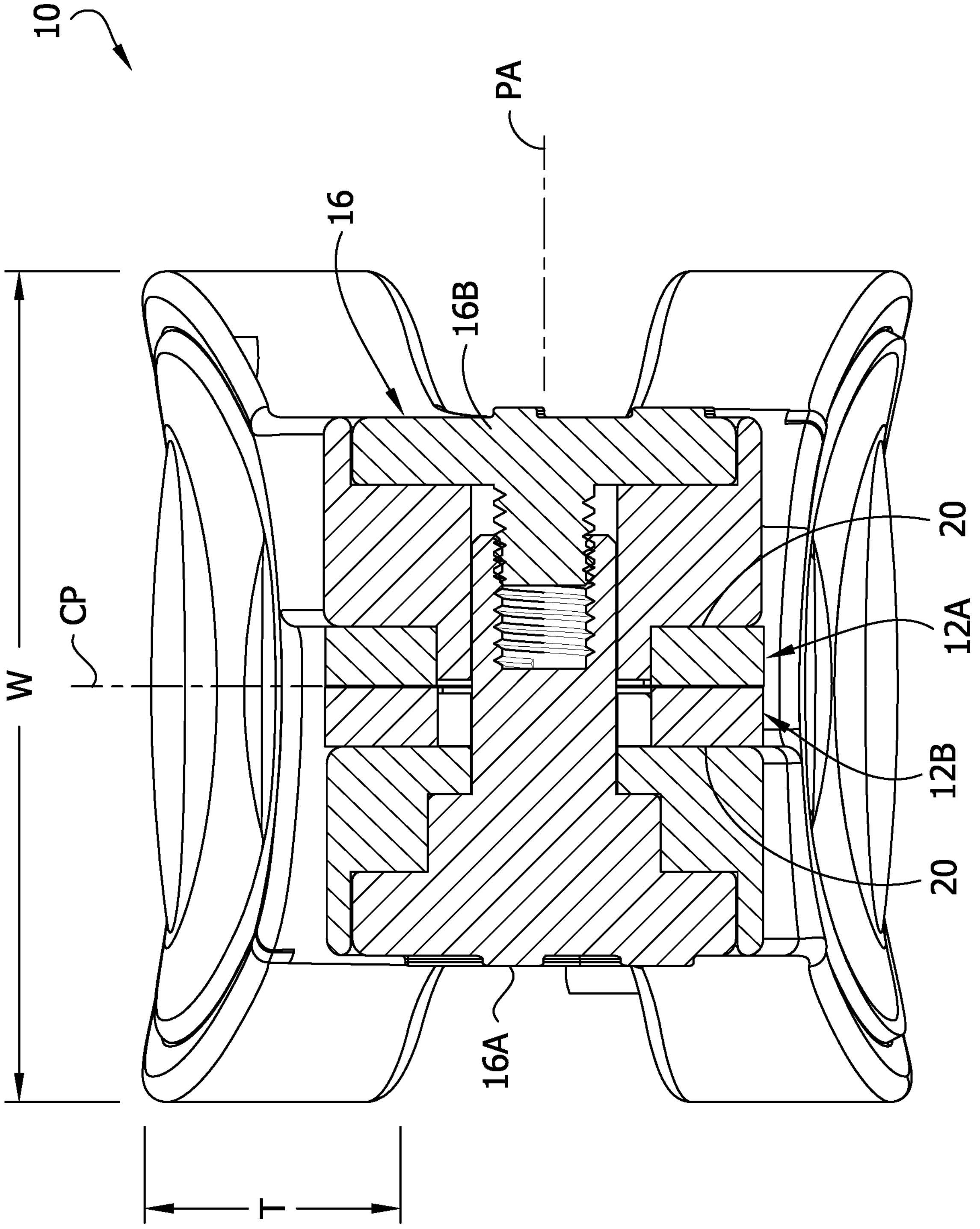
FIG. 3 is a section of the nipper taken in a plane including line 3-3 of FIG. 2.
Figure 4:
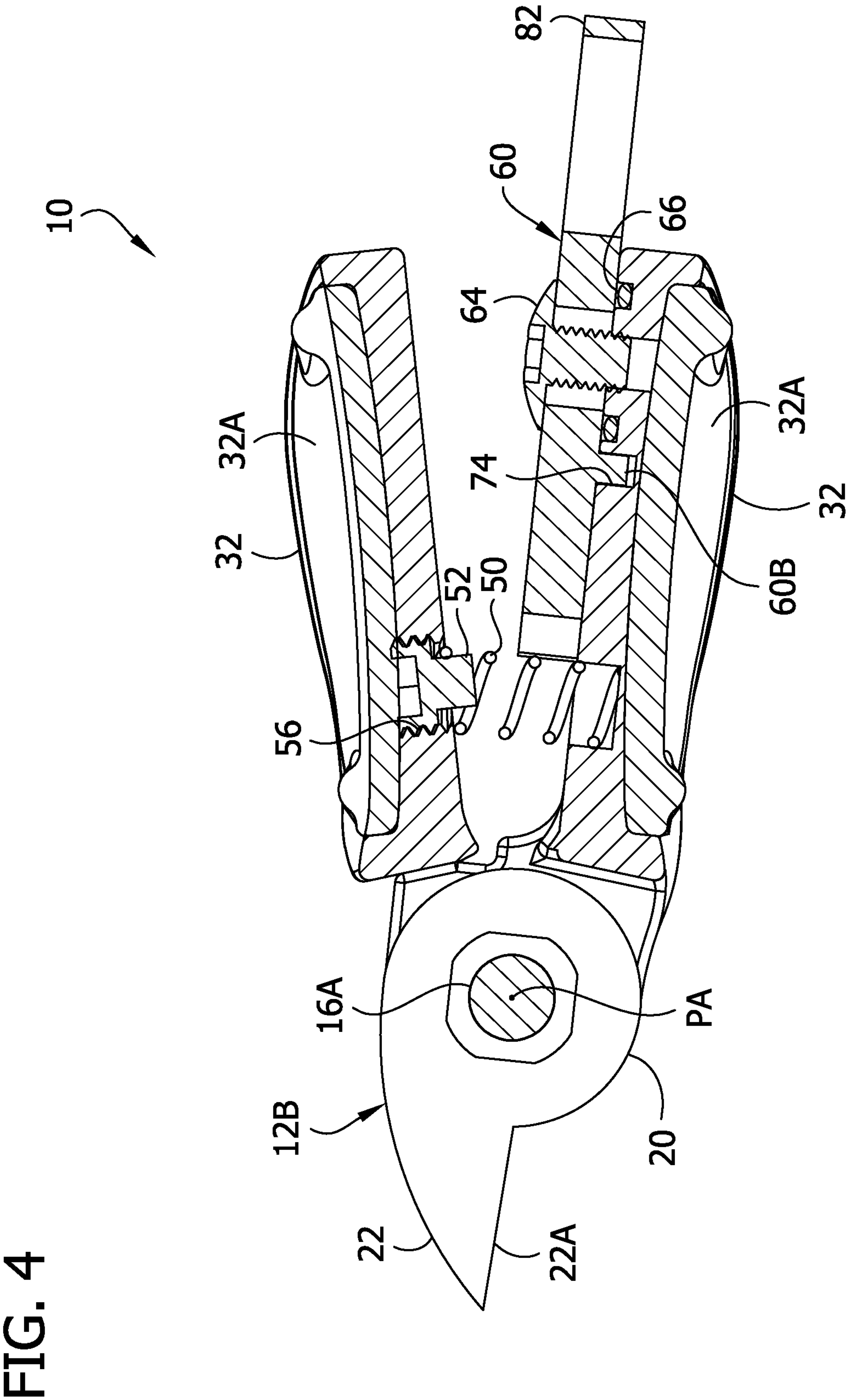
FIG. 4 is a section of the nipper taken in a plane including line 4-4 of FIG. 1.
Figure 5:
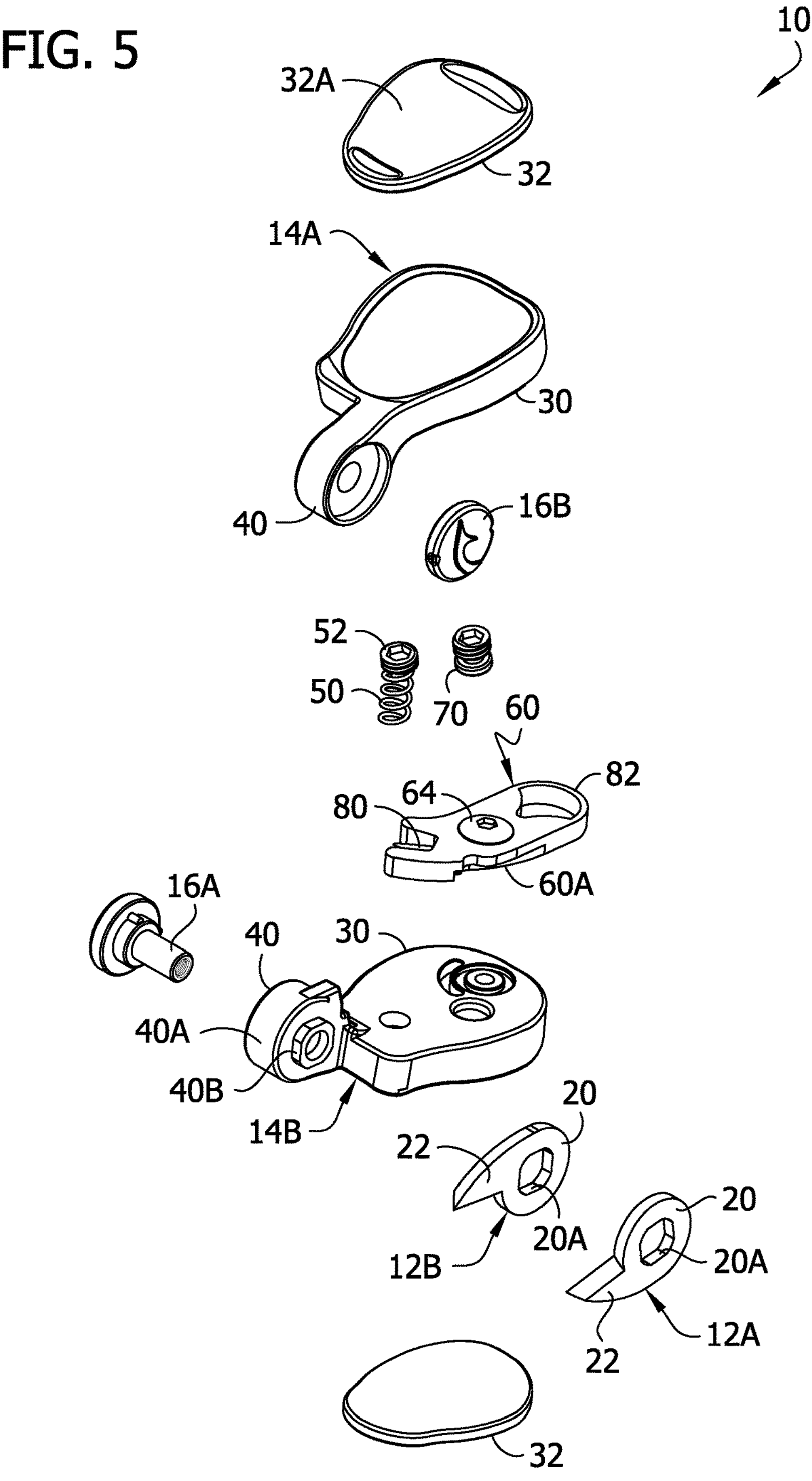
FIG. 5 is an exploded perspective of the nipper.
Figure 6:
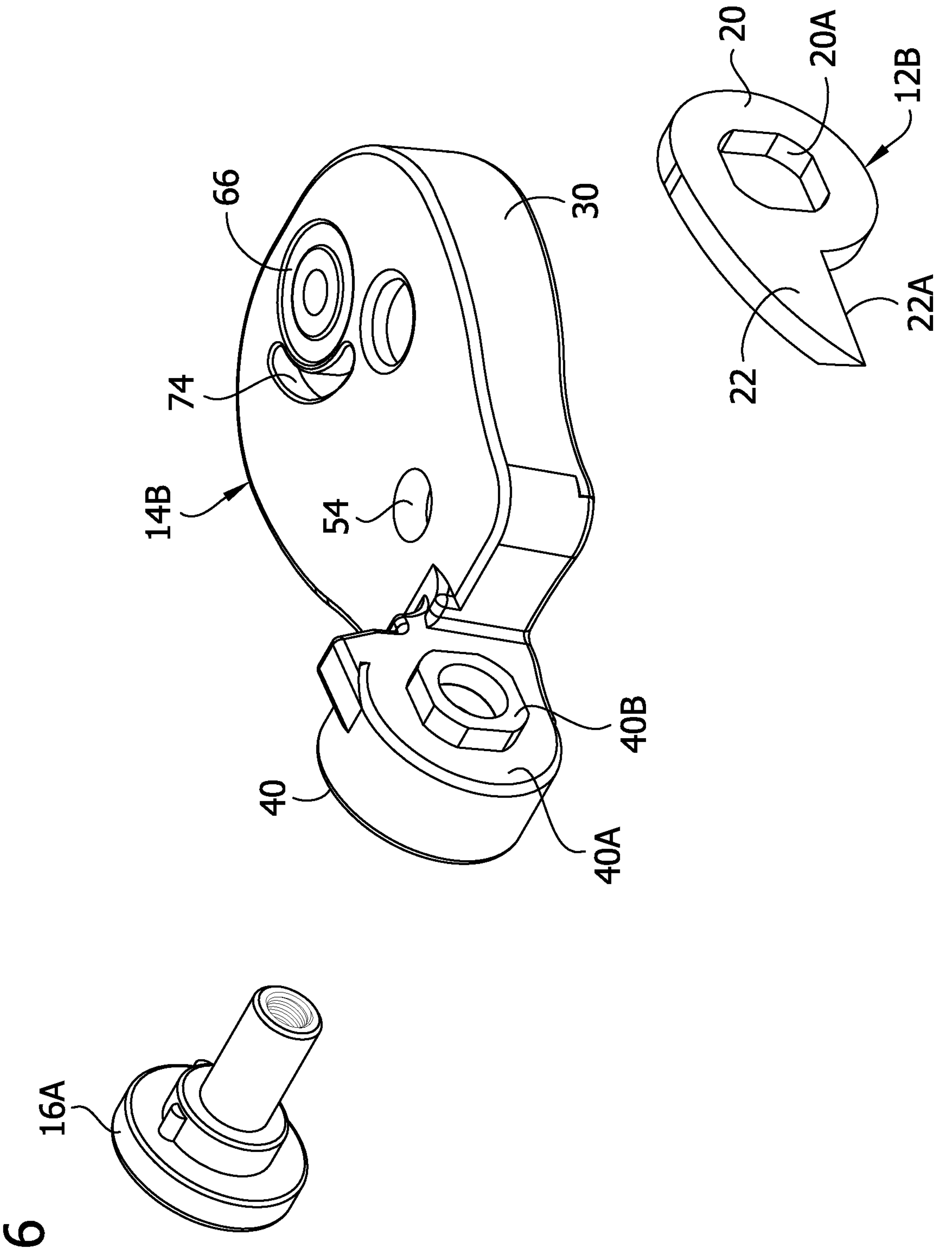
FIG. 6 is an exploded perspective of a second lever, a second jaw, and a second fastener portion of the nipper.
Figure 7:
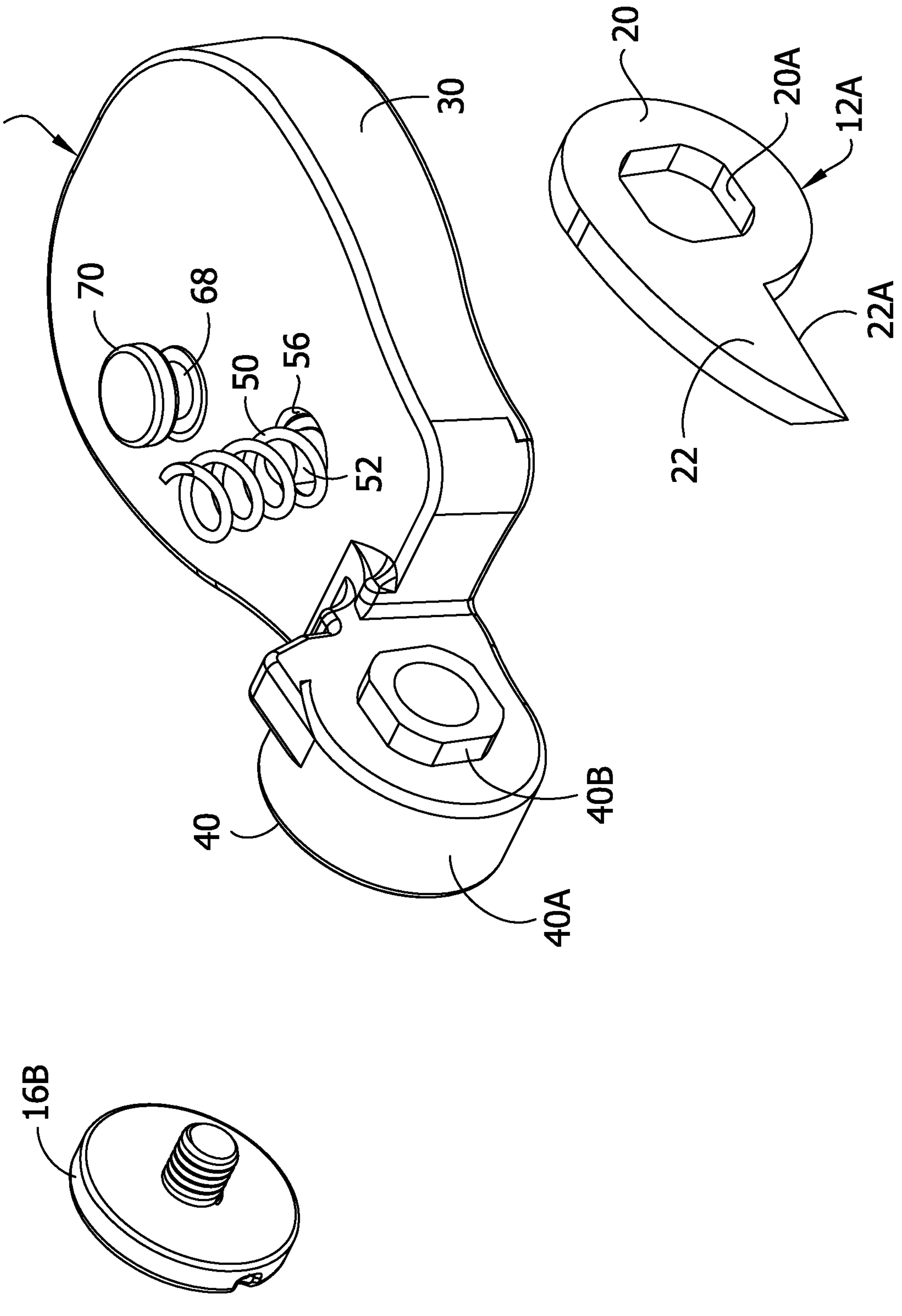
FIG. 7 is a bottom exploded perspective of a first lever, a first jaw, and a first fastener portion of the nipper.
Figure 8:
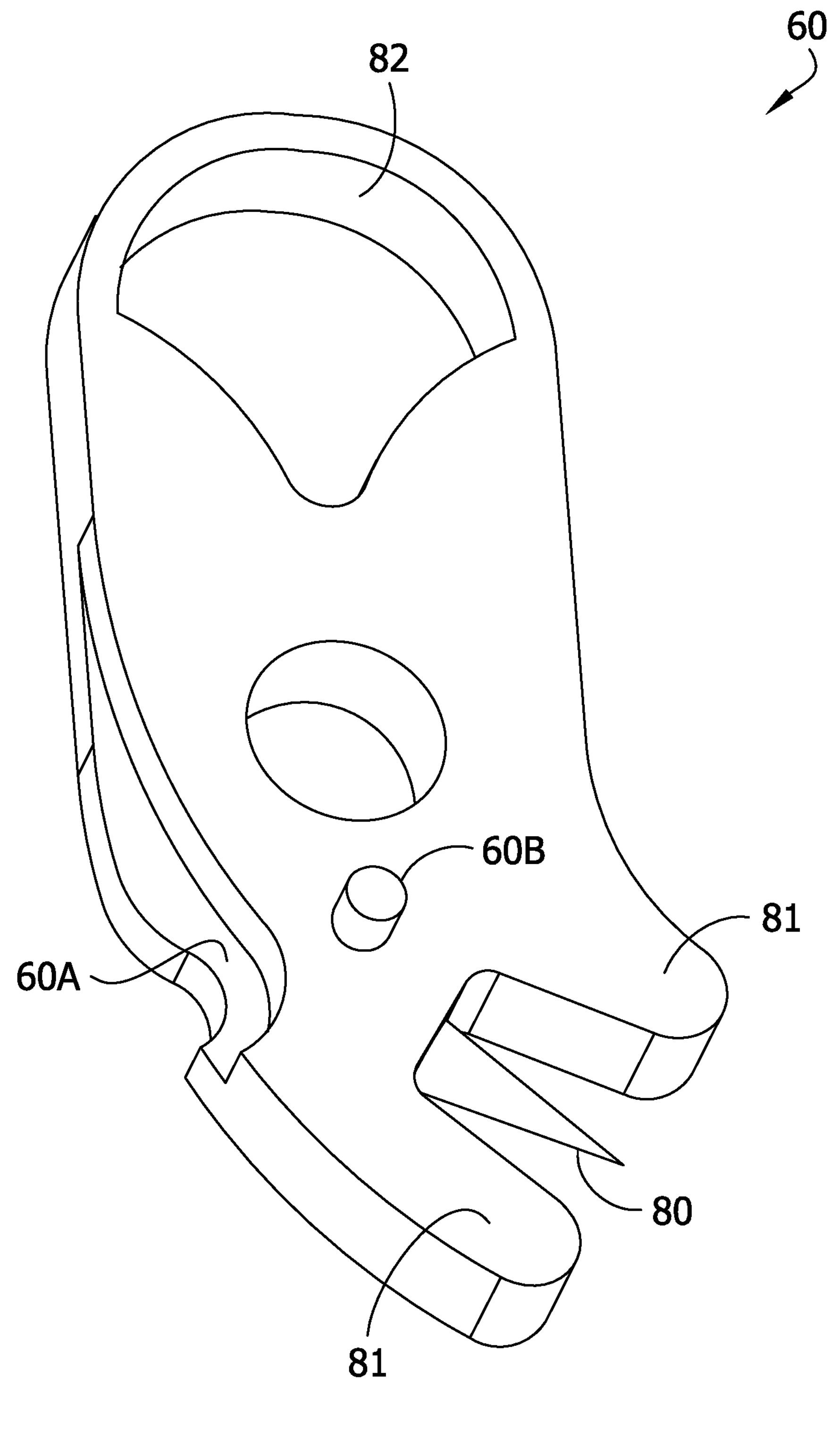
FIG. 8 is a perspective of a retainer of the nipper.

The lever pivot hubs 40 have openings permitting the fastener 16 to pass therethrough. As shown in FIG. 3, the fastener 16 passes through the keyed connections of the first and second jaws 12A, 12B and levers 14A, 14B. The fastener 16 includes a first fastener portion 16A and a second fastener portion 16B threaded to the first fastener portion. Threading of the fastener portions 16A, 16B to each other causes heads of the fastener portions to push the lever pivot hubs 40 toward each other and thus pushes the jaw pivot hubs 20 toward each other. The arrangement is such that the jaw pivot hubs 20 are pressed against each other and are sandwiched by the lever pivot hubs 40. The keys 40B of the lever pivot hubs 40 are shorter than the thickness of the jaw pivot hubs 20 such that the lever pivot hubs are spaced from each other and do not obstruct the lever pivot hubs from pressing the jaw pivot hubs against each other. As seen in FIG. 3, a gap is present between the lever pivot hubs 40.

The levers 14A, 14B are biased away from each other by a spring 50 such that the jaws 12A, 12B are normally open. In the illustrated embodiment, the spring 50 comprises a compression spring captured between the first and second arms 30 of the first and second levers 14A, 14B. The spring 50 is received over a protrusion 52 on an inner surface of the arm 30 of the first lever 14A and is received in an opening 54 in the inner surface of the arm of the second lever. The protrusion is defined by a fastener 52 threaded in a threaded opening 56 in the arm 30 of the first lever 14A. In assembly, the compression spring 50 can be installed between the levers 14A, 14B by passing a first end of the spring through the threaded opening 56 and then installing the fastener 52 in the threaded opening. The finger bed 32 can then be installed on the arm substructure to cover the threaded opening 56.

The nipper 10 includes a retainer 60 for maintaining the nipper in a closed configuration in which the jaws 12A, 12B are closed and the levers 14A, 14B are near each other. In the illustrated embodiment, the retainer 60 comprises a pivotable latch connected to the second lever 14B by a threaded fastener 64. An O-ring 66 is captured between the lever 14B and the latch 60 in an annular recess in the lever to provide frictional resistance to the latch pivoting between latched (retaining) and unlatched (non-retaining) positions. When the levers 14A, 14B are pressed toward each other to close the jaws 12A, 12B, the latch 60 can be pivoted to the latched position by overcoming the frictional resistance of the O-ring 66 such that a catch 60A engages a recess 68 in a stud 70 extending from the first lever 14A. In the latched position, the catch 60A in the recess 68 prevents the levers 14A, 14B from moving away from each other and thus holds the jaws 12A, 12B closed. The frictional resistance of the O-ring 66 maintains the latch 60 in the latched position. When a user desires to use the nipper 10 again, the latch 60 can be pivoted against the frictional resistance of the O-ring 66 to the unlatched position, and the user can permit the spring 50 to push the levers 14A, 14B away from each other such that the jaws 12A, 12B open. The latch 60 includes a pivot guide 60B in the form of a protrusion (e.g., stud) receivable in an arcuate track 74 in an inner side of the arm 30 of the second lever 14B. A first closed end of the arcuate track 74 defines the position of the latch 60 in the latched position. A second closed end of the arcuate track 74 defines the deployed position of a poker 80.

The retainer 60 includes a lanyard connector 82 including an opening configured for connecting the nipper to a lanyard (e.g., cord, strap, and/or clip, etc.) for stowing the nipper. The retainer 60 includes the poker 80 having a pointed free end for pushing paint out of an eyelet of a fishing hook to permit fishing line to be threaded through the eyelet. The poker 80 is shielded on opposite sides by first and second guards 81. The poker 80 can be selectively deployed by pivoting the retainer 60 about the fastener to expose the poker for use.

After a user locates an object (e.g., fishing line) to be cut in the jaws 12A, 12B, the user can press the levers 14A, 14B toward each other to cause conjoint pivoting of the levers and their respective jaws to move the jaws in a cutting motion. The cut free end of fishing line can be threaded through an eyelet fishing hook or lure after using the poker 80 to remove paint from the eyelet, if necessary.

To assemble the nipper 10, the keyed connections of the jaws 12A, 12B and levers 14A, 14B can be made, the fastener 16 can be passed through the keyed connections to maintain the keyed connections and secure the jaws and levers to each other, the spring 50 can be installed between the levers by passing the spring into the threaded opening 56, and the spring can be retained between the levers at a desired spring preload by threading the fastener 52 into the threaded opening. The fastener 16 presses the jaws 12A, 12B against each other by sandwiching the jaws with the lever pivot hubs 40.

It will be apparent that modifications and variations are possible without departing from the scope of the invention defined in the appended claims. The dimensions and proportions described herein are by way of example without limitation. Other dimensions and proportions can be used without departing from the scope of the present disclosure.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A nipper scissors usable by a person for cutting a fishing line, the nipper scissors comprising:

a first jaw including a first cutting edge and a first jaw pivot hub, the first cutting edge extending forward of the first jaw pivot hub, the first jaw pivot hub including first jaw keying structure;

a first lever including a first lever pivot hub and a first arm, the first arm extending rearward of the first lever pivot hub, the first lever pivot hub including first lever keying structure, the first lever keying structure being mated with the first jaw keying structure to form a first keyed connection between the first lever pivot hub and the first jaw pivot hub;

a second jaw including a second cutting edge and a second jaw pivot hub, the second cutting edge extending forward of the second jaw pivot hub, the second jaw pivot hub including second jaw keying structure;

a second lever including a second lever pivot hub and a second arm, the second arm extending rearward of the second lever pivot hub, the second lever pivot hub including second lever keying structure, the second lever keying structure being mated with the second jaw keying structure to form a second keyed connection between the second lever pivot hub and the second jaw pivot hub; and a fastener pivotably connecting the first jaw hub to the second jaw hub and defining a pivot axis about which the first and second cutting edges are pivotable upward and downward with respect to each other for moving the cutting edges toward each other to a closed arrangement and away from each other to an open arrangement, the first and second cutting edges extending forward of the pivot axis, and the first and second arms extending rearward of the pivot axis;

wherein the first keyed connection connects the first cutting edge and the first arm for conjoint pivoting of the first cutting edge and the first arm about the pivot axis in which downward pivoting of the first arm causes upward pivoting of the first cutting edge, and the second keyed connection connects the second cutting edge and the second arm for conjoint pivoting of the second cutting edge with the second arm about the pivot axis in which upward pivoting of the second arm causes downward pivoting of the second cutting edge;

wherein the first and second cutting edges are biased by a spring away from each other toward the open arrangement;

wherein the first arm includes a first finger bed facing upward and the second arm includes a second finger bed facing downward, the first finger bed being configured to receive a first fingertip of the person, the second finger bed being configured to receive a second fingertip of the person, the first finger bed being arranged with respect to the second finger bed to permit the person to pinch the first and second finger beds toward each other between the first and second fingertips to move the cutting edges from the open arrangement to the closed arrangement;

wherein the first jaw keying structure comprises a first opening, and the first lever keying structure comprises a key received in the first opening;

wherein the fastener is in the first opening.

2. A nipper scissors as set forth in claim 1, wherein the second jaw keying structure comprises a second opening, and the second lever keying structure comprises a key received in the second opening.

3. A nipper scissors as set forth in claim 1, wherein each of the first finger bed of the first arm and the second finger bed of the second arm is paddle-shaped.

4. A nipper scissors as set forth in claim 3, wherein the arms each include a proximal end connected to the respective one of the lever pivot hubs and a distal end opposite the proximal end, the arms being pivotable away from each other to a maximum distance between the distal ends of the arms, said maximum distance being less than the width of the first arm and less than the width of the second arm.

5. A nipper scissors as set forth in claim 3 wherein the arms are less than 2.5 inches long.

6. A nipper scissors as set forth in claim 1, wherein the arms each include a proximal end connected to a respective one of the lever pivot hubs and a distal end opposite the proximal end, the arms being pivotable away from each other to a maximum distance between the distal ends of the arms, said maximum distance being less than 1.5 inches.

7. A nipper scissors as set forth in claim 6, wherein the cutting edges are less than one inch long.

8. A nipper scissors as set forth in claim 1, wherein the first finger bed and second finger bed each have concave press surfaces.

9. A nipper scissors as set forth in claim 8, wherein each arm has a length extending rearward from the lever pivot hub, a width extending between opposite left and right sides of the arm, and a thickness transverse to the width and the length, the first finger bed press surface and second finger bed press surface each being concave widthwise of the respective arm.

10. A nipper scissors as set forth in claim 1, wherein the first finger bed and second finger bed each have non-convex press surfaces.

11. A nipper scissors as set forth in claim 1, wherein the fastener is received in the first and second jaw pivot hubs and the first and second lever pivot hubs.

12. A nipper scissors as set forth in claim 1, wherein the first and second lever pivot hubs extend forward of the pivot axis.

13. A nipper scissors as set forth in claim 12, wherein the first and second jaw pivot hubs extend rearward of the pivot axis.

14. A nipper scissors as set forth in claim 1, further comprising a retainer connected to the first lever and moveable between retaining and non-retaining positions, the retainer in the retaining position retaining the cutting edges in the closed arrangement, and the retainer in the non-retaining position permitting the cutting edges to pivot away from each other.

15. A nipper scissors as set forth in claim 14, wherein the retainer is movable laterally between the retaining and non-retaining positions.

16. A nipper scissors as set forth in claim 15, wherein the retainer comprises a latch pivotable laterally between the retaining and non-retaining positions.

17. A nipper scissors as set forth in claim 14, further comprising a poker on the retainer, the poker having a pointed free end configured to remove paint from an eyelet of a fishing hook.

18. A nipper scissors as set forth in claim 1, further comprising a poker connected to the first lever, the poker having a pointed free end configured to remove paint from an eyelet of a hook, the poker being shielded by first and second guards alongside the poker on opposite sides of the poker, the poker and guards being pivotable with respect to the first lever between a stowed position and a deployed position.

19. A nipper scissors as set forth in claim 1, wherein the first arm is free of structure forming a loop in which the person's thumb tip is received for engaging the thumb bed, and the second arm is free of structure forming a loop in which the person's fingertip is received for engaging the finger bed.

* * * * *